US009874747B2

(12) United States Patent
Bar et al.

(10) Patent No.: US 9,874,747 B2

(45) Date of Patent: Jan. 23, 2018

(54) DOUBLE-PANE MODULE WITH AN IMAGE PRODUCING DEVICE FOR USE IN A STRUCTURE AND A METHOD FOR PRODUCING SUCH MODULE

(71) Applicant: ORAN PALMACH ZOVA AGRICULTURAL COLLECTIVE CORPORATION LTD., D.N. Harey Yehuda (IL)

(72) Inventors: Zvika Bar, D.N. Harey Yehuda (IL); Irina Kiryuschev, Oranit (IL)

(73) Assignee: ORAN PALMACH ZOVA AGRICULTURAL COLLECTIVE CORPORATION LTD., D.N. Harey Yehuda (IL)

( * ) Notice: Subject to any disclaimer, the term of this patent is extended or adjusted under 35 U.S.C. 154(b) by 0 days.

(21) Appl. No.: 14/852,203

(22) Filed: Sep. 11, 2015

(65) Prior Publication Data

US 2016/0004080 A1 Jan. 7, 2016

Related U.S. Application Data

(63) Continuation-in-part of application No. PCT/IL2013/050245, filed on Mar. 15, 2013.

(51) Int. Cl.

*E04F 19/00* (2006.01)
*G02B 27/01* (2006.01)

(Continued)

(52) U.S. Cl.

CPC ............ *G02B 27/0149* (2013.01); *E06B 3/66* (2013.01); *E06B 7/28* (2013.01);

(Continued)

(58) Field of Classification Search

CPC ....... G02B 27/0149; E06B 3/66; E06B 3/645; E06B 7/28; E06B 2009/2411;

(Continued)

(56) References Cited

U.S. PATENT DOCUMENTS 4,295,305 A * 10/1981 Shelver .................... E06B 3/62 52/172
5,111,629 A * 5/1992 Baughman ............ E06B 3/6722 52/171.3

(Continued)

FOREIGN PATENT DOCUMENTS

DE 3509677 9/1985
DE 19714908 10/1998

(Continued)

*Primary Examiner* — Chi Q Nguyen

(74) *Attorney, Agent, or Firm* — Dorsey & Whitney LLP

(57) ABSTRACT

A module including two transparent panes; a sealing and spacing arrangement sealingly fixing the panes to each other along their periphery at spaced apart relationship, thereby forming between the inner surfaces of the panes a transparent sealed cavity with a sealing frame surrounding it; and an image producing device fixedly mounted within the cavity so as to allow viewing images produced thereby. The module for mounting in the structure so as to fulfill the function of a transparent member such as a window, a door or a wall, separating between the space in said interior of the structure accommodating said person and a region behind the member, and to allow viewing at least through a portion of the cavity. The module can include optional features, and methods are provided for producing a structure therewith and for upgrading existing structures by using the module instead of an original transparent component.

20 Claims, 12 Drawing Sheets

(51) Int. Cl.

| | |
|---|---|
| ***E06B 3/66*** | (2006.01) |
| ***E06B 7/28*** | (2006.01) |
| *E06B 9/24* | (2006.01) |
| *G09G 3/18* | (2006.01) |
| *G09F 23/06* | (2006.01) |
| *G09F 9/35* | (2006.01) |
| *B60R 11/00* | (2006.01) |
| *G06F 3/041* | (2006.01) |
| *G09F 23/00* | (2006.01) |
| *E06B 3/64* | (2006.01) |
| *G09F 13/00* | (2006.01) |
| *G06F 3/045* | (2006.01) |

(52) U.S. Cl.
CPC ....... *B60R 2011/0026* (2013.01); *E06B 3/645* (2013.01); *E06B 2009/2411* (2013.01); *E06B 2009/2464* (2013.01); *G06F 3/045* (2013.01); *G06F 3/0412* (2013.01); *G09F 9/35* (2013.01); *G09F 13/00* (2013.01); *G09F 23/06* (2013.01); *G09F 23/065* (2013.01); *G09F 2023/0025* (2013.01); *G09G 3/18* (2013.01); *Y02B 80/50* (2013.01)

(58) Field of Classification Search
CPC .... E06B 2009/2464; G09F 9/35; G09F 13/00; G09F 2023/0025; G09F 23/06; G09F 23/065; G09G 3/18; B60R 2011/0026; G06F 3/0412; G06F 3/045; Y02B 80/50
USPC .................... 52/171.3, 173.1, 786.1–786.13, 52/786.11–786.13; 428/34; 40/552
See application file for complete search history.

(56) References Cited

U.S. PATENT DOCUMENTS

| | | | | | |
|---|---|---|---|---|---|
| 5,197,242 | A * | 3/1993 | Baughman | B32B 17/10045 | 349/16 |
| 6,429,961 | B1 * | 8/2002 | Harary | B32B 17/10055 | 359/265 |
| 6,457,286 | B1 * | 10/2002 | Eliyahu | B44C 5/04 | 40/552 |
| 7,109,959 | B2 | 9/2006 | Libby et al. | | |
| 7,891,154 | B2 * | 2/2011 | Cording | A47F 3/0434 | 52/171.2 |
| 2003/0146889 | A1 | 8/2003 | Libby et al. | | |
| 2004/0160538 | A1 * | 8/2004 | Li | C09K 19/544 | 349/16 |
| 2005/0007505 | A1 * | 1/2005 | Faris | C09B 67/0098 | 349/16 |
| 2006/0192767 | A1 * | 8/2006 | Murakami | G06F 3/0412 | 345/173 |
| 2007/0242174 | A1 * | 10/2007 | Maisuradze | G02F 1/133 | 349/16 |
| 2011/0148218 | A1 * | 6/2011 | Rozbicki | G02F 1/163 | 307/104 |
| 2012/0285089 | A1 * | 11/2012 | Artwohl | A47F 3/0434 | 49/70 |
| 2013/0271696 | A1 * | 10/2013 | Dunn | G09F 23/06 | 349/58 |
| 2015/0103389 | A1 * | 4/2015 | Klawuhn | E06B 9/24 | 359/275 |

FOREIGN PATENT DOCUMENTS

| | | |
|---|---|---|
| FR | 2423621 | 11/1979 |
| KR | 101081617 | 11/2011 |
| WO | WO9842163 | 9/1998 |
| WO | WO09018828 | 2/2009 |

* cited by examiner

| REFERENCE | ORGANIZATION | TITLE |
|---|---|---|
| EN 50121-3-1 | AFNOR | Railway applications - Electromagnetic compatibility Part 3-1: Rolling stock - Train and complete vehicle. |
| EN 50121-3-2 | AFNOR | Railway applications - Electromagnetic compatibility-Part 3-2: Rolling stock - Apparatus. |
| EN 50121 | AFNOR | Railway applications - Electromagnetic compatibility. |
| EN 13272 | AFNOR | Railway applications - Electrical lighting for rolling stock in public transport systems. |
| EN 50124-1 | AFNOR | Railway applications - Insulation coordination - Part 1: Basic requirements - Clearances and creepage distances for all electrical and electronic equipment |
| EN 50343 | AFNOR | Railway applications - Rolling stock - Rules for installation of cabling |
| EN 50306 | ISO AFNOR | Railway applications - Railway rolling stock cables having special fire performance; Thin wall. |
| NF F 61010 | AFNOR | Railway rolling stock. General rules for cabling and apparatus mechanical fixing. |

| | | |
|---|---|---|
| NF F 31314 | AFNOR | Railway rolling stock - Insulating glass units |
| NF F 31129 | AFNOR | Railway rolling stock - Toughened safety glass panels |
| NF F 31250 | AFNOR | Railway rolling stock - laminated safety glass |
| BN 918 511 | Deutsche Bahn | for toughened safety glass, laminated safety glass and insulation glass |
| ECE-R 43 | (UN/ECE) | the approval of safety glazing materials and their installation on vehicles |
| ANSI Z 26.1 | SAE | Safety Glazing Materials-Motor Vehicles and Motor Vehicle Equipment |
| BS 857;1967 | British Standard | Specification for flat or curved safety glasses (toughened or laminated) for use in land vehicles |
| GM/RT2100 | Railway Group Standard | Structural Requirements for Railway Vehicles |
| FRA TYPE I, FRA TYPE II | Federal Railroad Administration | SAFETY GLAZING STANDARDS--LOCOMOTIVES, PASSENGER CARS AND CABOOSES |

Fig. 10

| | | |
|---|---|---|
| 3381 | ISO | Railway applications - Acoustics - Measurement of noise inside rail-bound vehicles. |
| 3095 | ISO | Railway applications - Acoustics - Measurement of noise emitted by railbound vehicles. |
| SI 1918 | Israeli standard | Accessibility. |
| 61287 | CEI | Railway applications - Power convertors installed on board rolling stock |
| EN 50153 | AFNOR | Railway applications - Rolling stock - Protective provisions relating to electrical hazards |
| EN 50155 | AFNOR | Railway applications - Electronic equipment used on rolling stock |
| EN 50124-2 | AFNOR | Railway applications - Insulation coordination-Part 2:Over-voltages and related protection |
| 60571 | CEI | Electronic equipment used on rail vehicles |
| 60077-1 | CEI | Railway applications - Electric equipment for rolling stock - Part 1: General service conditions and general rules |
| 60077-2 | CEI | Railway applications - Electric equipment for rolling stock - Part 2: Electrotechnical components; General rules |
| 60085 | CEI | Electrical insulation - Thermal evaluation and designation |
| MIL-HDBK-217 | USA, Department of Defense | Military Handbook: Reliability Prediction of Electronic Equipment |
| 61508 | IEC | Functional safety of electrical/electronic/programmable safety-related systems |

| | | |
|---|---|---|
| July 1999/519/CE | CE | July 1999/519/CE European Recommendation. |
| EN 50125-1 | AFNOR | Railway applications - Environmental conditions for equipment - Part 1: Equipment on board rolling stock. |

| | | |
|---|---|---|
| NF F 31119 | AFNOR | Railway rolling stock. Behavior of rolling stock's seats at statics stress, fatigue stress, vibrations stress and shocks stress. |
| EN 61373 | AFNOR | Railway applications - Rolling stock equipment - Shock and vibration tests |

| | | |
|---|---|---|
| NF F 31250 | AFNOR | Railway rolling stock. Laminated glass. |
| NF F 31129 | AFNOR | Railway rolling stock. Toughened safety-glass panels. |

| | | |
|---|---|---|
| EN 894 | ISO | Safety of machinery - Ergonomics requirements for the design of displays and control actuators |

Fig. 10 (Continue)

DOUBLE-PANE MODULE WITH AN IMAGE PRODUCING DEVICE FOR USE IN A STRUCTURE AND A METHOD FOR PRODUCING SUCH MODULE

TECHNOLOGICAL FIELD

The presently disclosed subject matter refers to transparent members such as windows, doors, walls, etc., having an image producing device incorporated therein.

PRIOR ART

U.S. Pat. No. 7,109,959 discloses a window with a display held by its frame.

KR 101,081,617 discloses a transparent door of a refrigerator with a transparent LCD attached thereto.

DE 19,714,908 discloses a multi-wall window panel with an intermediate space, in which different functional elements can be inserted including an LCD.

SUMMARY OF THE PRESENTLY DISCLOSED SUBJECT MATTER

In accordance with one aspect of the presently disclosed subject matter, there is provided a module for mounting in a structure having an interior and configured for accommodating within this interior at least one person, the module comprising:

- two transparent panes each having an inner surface facing towards the other pane and outer surface facing away from the other pane;
- a sealing and spacing arrangement sealingly fixing the panes to each other along their periphery at spaced apart relationship, thereby forming between the inner surfaces of the panes a transparent sealed cavity with a sealing frame surrounding it;
- an image producing device fixedly mounted within said cavity so as to allow viewing images produced thereby, from a viewing direction facing the outer surface of a first of said panes, while being spaced from the inner surface of the second pane; and
- the module being configured for being mounted in said structure so as:
  - to fulfill the function of a transparent member such as a window, a door or a wall, separating between the space in said interior of the structure accommodating said person and a region behind said member, and
  - to allow viewing at least through said portion of the cavity.

In accordance with another aspect of the presently disclosed subject matter, the model can comprise at least one concealing component configured for preventing:

- said device from being viewed from a direction other than said viewing direction, and/or
- any proximate operational component associated with said device and located within said cavity so that, if not concealed, it will be viewed from a direction facing the outer surface of at least one of the panes, from being viewed in such direction, said device, said proximal operational component, if any, and said concealing component being disposed so as to leave free for viewing through at least a portion of the cavity area.

In accordance with a further aspect of the presently disclosed subject matter, said structure can be a movable structure whose transparent member having said function must meet requirements dictated by the movement to be performed by the structure, and the module meets such requirements.

In accordance with a further aspect of the presently disclosed subject matter, there is provided a structure including a module according to any of the above aspects, and a method for producing such structure or upgrading an existing structure by using therein a module according to any of the above aspects instead of an original transparent component.

In accordance with a further aspect of the presently disclosed subject matter, there is provided a structure having an interior and configured for accommodating within this interior at least one person, the structure comprising a wall with an opening and at least a passage extending within said wall from said opening in a direction away therefrom, for accommodating a cable connecting a module mounted in the structure with a distal operational component required for the operation of the device and disposed remote from the module.

When the module according to any of the above aspects is intended to be used instead of a standard/original transparent member in a structure, where such member is intended for allowing viewing therethrough in two opposite directions, said module has shape and dimensions of said standard/original transparent member, and the portion of its cavity which is free of the image producing device and other associated components, allows said viewing in two opposite directions.

The operational component can be concealed from being viewed in two directions, each facing the outer surface of one of the panels, by two concealing components.

The concealing component can occupy an area corresponding to that of the device or of the component to be concealed, or can be in the form of a frame surrounding at least a portion of the image producing device, when seen through the corresponding pane.

The module can comprise at least one cable connected to said device and/or to its proximal operational component, and extending therefrom via said sealed frame to an exterior of the module, the at least one cable being configured to provide the device and/or the proximal operational component with a connection to at least one distal operational component disposed at a location remote from said module and required for the operation of the device. The cable's portion disposed within the cavity can also be concealed by a dedicated concealing component, if necessary.

The distal component can be constituted by one or more components required for the operation of the device.

The module can constitute a window in said structure when mounted within an opening in a wall thereof, said wall comprising at least a passage located so as to allow the cable to extend from the module to the passage, the passage being suitable for receiving said cable and allowing its extension to the distal operational component disposed at a location remote from said window. The wall can have an external surface, internal surface, and a space therebetween including a passage. The location at which the distal operational component is disposed can be within said space, between a roof and a ceiling of the structure, under a floor of the structure, or any other suitable place.

The structure can constitute a compartment within a vehicle or a vessel comprising a plurality of such compartments, of which more than one compartment comprising a plurality of openings in its wall, with said modules mounted in more than one opening.

The module can meet all requirements defined in a standard regulating characteristics of transparent or glass components in said vehicle or vessel, except for being not transparent or having a reduced transparency in the area of the module occupied by said image producing device.

In accordance with a further aspect of the presently disclosed subject matter, there can be provided method for producing a structure having an interior and configured for accommodating within said interior at least one person, with an image displaying function, the structure comprising a wall with an opening for a window and at least a passage extending within said wall from said opening in a direction away therefrom; the method comprising:

providing a module having two transparent panes and a sealing and spacing arrangement sealingly fixing the panes to each other along their periphery at spaced apart relationship, thereby forming therebetween a transparent sealed cavity with a sealing frame surrounding it; an image producing device fixedly mounted within said cavity so as to leave free for viewing through at least a portion of the cavity area; a distal operational component remote from said window, required for the operation of the image producing device, and at least one cable extending to the exterior of the module from said device within said cavity via said sealed frame;

mounting said module within said opening so as to allow viewing images produced by said device;

passing said cable along said passage towards said distal operational component and connecting them to each other.

Any of the modules referred to above, can comprise more than one image producing devices, each fixedly mounted within said cavity, so as to allow viewing images produced by each device through the corresponding pane.

When the module is configured to be used instead of a standard/original window with which said structure used to be produced intended for allowing viewing therethrough in two opposite directions, said module has shape and dimensions of said standard/original window.

The structure in which a module as described above is to be mounted can further comprise speakers or an audio output socket or device disposed either within said interior space or adjacent to said window so as to allow sound applications in relation with images being displayed.

The structure in which a module as described above is to be mounted can be constituted by a compartment of a vehicle or vessel.

The structure can comprise an electric power source electrically connected with said device via said cable or with said control unit, as well as with other components of the structure disposed remote from said module.

The structure can comprise a plurality of said modules with corresponding control units disposed remote therefrom, an operator interface and means of communication each control unit with the operator interface, thereby allowing operation and control of any of the imaging displaying devices from the operator interface.

The proximal operational component mentioned above can be a driving board, timing controller board, a cable extending therefrom to the exterior of the module, or any other component necessary to the operation of the device, and which located inside the cavity.

The image producing device can be of a kind that comprises a display component, which produces images to be viewed as indicated above, and which needs to be illuminated to make the images visible to the viewer. The image producing device can thus use external illumination from a source outside the module or can include an illuminating component mounted within the module adjacent or spaced from the display component. For example, the illumination component can be mounted to either one of the panes or to a side wall of the cavity, if any, and can provide edge or back illumination to the display component. If a heat removal is required for the illumination component, a corresponding heat sink can be used in the module, and it can constitute the proximal operational component concealed as described above.

In accordance with a still further aspect of the presently disclosed subject matter, there is provided a module for mounting in a structure having an interior and configured for accommodating within this interior at least one person, the module comprising:

(a) two transparent panes each having an inner surface facing towards the other pane and outer surface facing away from the other pane;

(b) a sealing and spacing arrangement sealingly fixing the panes to each other along their periphery at spaced apart relationship, thereby forming between the inner surfaces of the panes a transparent sealed cavity with a sealing frame surrounding it;

(c) an image producing device fixedly mounted within said cavity so as to allow viewing images produced thereby, from a viewing direction facing the outer surface of a first of said panes; the image producing device comprising a display component for producing the images; the display component having two display component surfaces parallel to said panes, and top, bottom and side display component edges, at which said surfaces terminate; a first one of the display component surfaces being attached to or disposed adjacent the first pane and the second one of these surfaces facing in the direction of the second pane;

at least one illumination system for illuminating the display component so as to allow said viewing, including an illumination source disposed adjacent at least one of said edges and a light guide plate disposed between the second display component surface and the second pane and aligned with said illumination source so as to receive illumination therefrom and direct it to said second display component surface; and (d) a heat sink mounted within the cavity in thermal contact with the illumination source for dissipating heat generated by the illumination source, the heat sink having a light guide plate supporting portion for at least aligning the light guide plate with the illumination source.

The heat sink and the illumination source can be mounted relative to the sealing and spacing arrangement of the structure either so that they are disposed further from this arrangement than the optical response component, or so that they are disposed closer to this arrangement than the optical response component. In the former case, the heat sink can be mounted in thermal contact with the first pane for dissipating the heat therethrough, which dissipation can be facilitated when the first pane faces in a direction of a relatively cool environment, i.e. an air conditioned interior or an exterior of the structure, in which the module is to be mounted. In the latter case, the heat sink and the illumination source can be incorporated within the sealing and spacing arrangement of the structure and dissipate heat towards the exterior of this arrangement.

The heat sink can be manufactured of any thermo-conductive material as aluminum, copper or similar.

The heat sink can be fixed in place and/or the illumination source can be fixed to the heat sink, using a thermo-conductive glue, thermos-conductive pad or paste placed between the heat sink and the surface it is attached to, and/or between the heat and the illumination source, for improving the thermal contact therebetween and facilitate the heat transfer.

If the heat sink and the illumination source described above are mounted so that, if not concealed, any of them will be viewed from a direction facing the outer surface of the first pane, they can be concealed by a corresponding concealing component.

The heat sink can be configured to hold the illumination source, constituting thereby an illumination-source unit.

In addition to the heat sink associated with the illumination source as described above, the module can comprise further heat sinks disposed at locations spaced from the illumination source and its associated heat sink, and these further heat sinks can receive heat from the heat sink associated with the illumination source, via a heat pipe. Such configuration can be advantageous, for example, when the illumination source is disposed adjacent the bottom edge of the display component. In this case, the heat pipe can have a horizontal bottom section in thermal contact the heat sink associated with the illumination source, and two vertical side sections, each being in contact with a corresponding side heat sink, all the heat sinks in thermal contact with the first pane.

Further features of the module, structure and methods described above are presented in the detailed description and claims of the application.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 10 is a list of standards, of which at least one can include requirements that need to be met by a module according to the presently disclosed subject matter if used for example in a train;

DETAILED DESCRIPTION OF EMBODIMENTS

Figure 1:
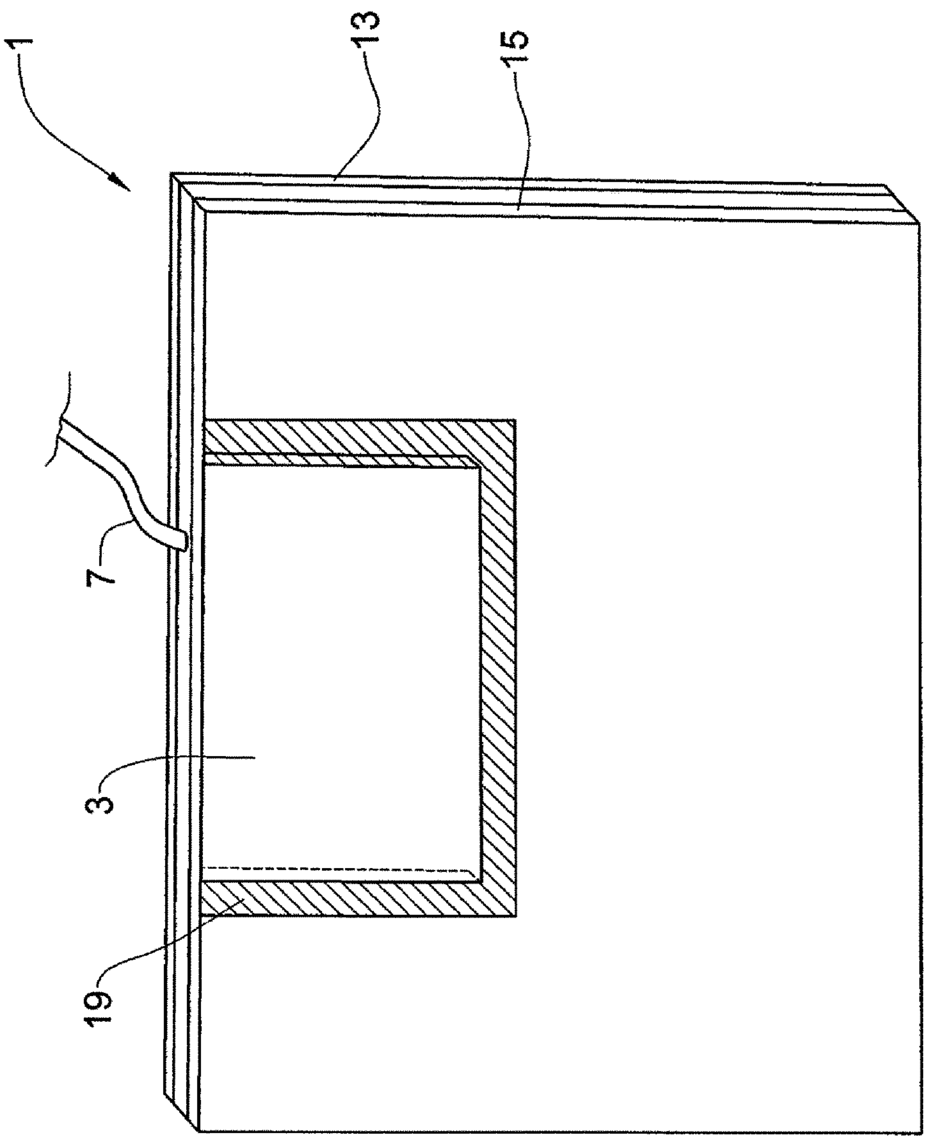
FIG. 1 is a schematic front perspective view of a double-pane window module in accordance with one example of the presently disclosed subject matter.
Figure 2:
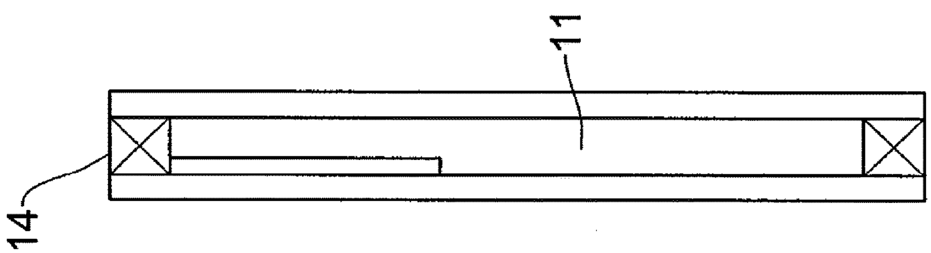
FIG. 2 is a side view of the window module shown in FIG. 1.

FIGS. 1 and 2 schematically illustrate a module 1 comprising two transparent panes 13 and 15, a hermetic sealing and spacing arrangement sealingly fixing the panes to each other, thereby forming a cavity 11 (FIG. 2) with a sealing frame 14 surrounding it.

The module further comprises an image producing device 3 fixedly mounted within the cavity 11 so as to allow viewing images produced thereby through one of the panes, and it can further comprise at least one proximal operational component configured for participating in the operation of the image producing device as will be described below in more detail with reference to FIG. 6.

The module further comprises a connecting cable 7 connected to the device 3 and/or to the proximal operational component, and extending therefrom via the sealed frame to an exterior of the module. The connecting cable is configured to provide the device and/or the proximal operational component with a connection to at least one distal operational component disposed remote from the module and required for the operation of the device and/or the proximal operational component, as will be described below in more detail with reference to FIG. 8.

Each pane 13, 15 of the module has an inner surface facing towards the other pane and outer surface facing away from the other pane.

They can be made from tempered glass or laminated composition of tempered glass, un-tempered glass, transparent plastic, polymer, polycarbonates, acryl or any other transparent material. They can be in various widths, colors, sizes, transparencies, shapes and flatness and can be identical or different from one another in any of these features.

The panes should be spaced from one another in a distance which on the one hand allows mounting of the image producing device therebetween, and on the other hand corresponds to the width of the place at which the module is to be mounted The sealing and spacing arrangement, which sealingly fixes the panes to each other along their periphery, thereby forming between the inner surfaces of the panes the transparent sealed cavity 11, prevents the formation of moisture therein. The image producing device 3 can be fixedly mounted within said cavity so as to allow viewing images produced thereby from a direction facing the outer surface of a first of the panes, while being spaced from the inner surface of the second pane. Such mounting can be in the form of attachment of the image producing device to one of the panes as shown in FIG. 2 or FIG. 3.

Figure 3:
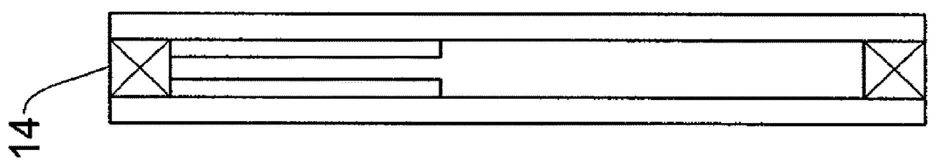
FIG. 3 is a schematic side view of a window module in accordance with another example of the presently disclosed subject matter.
Figure 4:
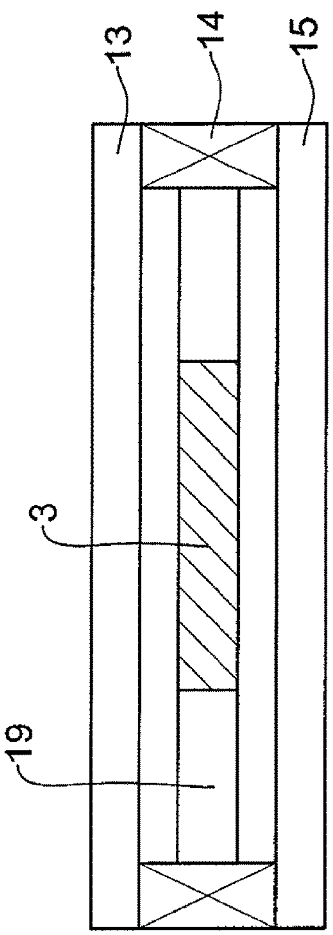
FIG. 4 is a schematic top view of a window module in accordance with another example of the presently disclosed subject matter.

Mounting of the image producing device within the cavity is preferably, but not exclusively, performed by means of attaching the device to one of the two panes, as shown in FIG. 2 and FIG. 3, in which case the device can be incapable, without the panes, of maintaining constructional integrity required for producing the images. FIG. 4 shows a module in which the device is carried by means of a third, transparent carrier pane 19, disposed between the two panes 11 and 13, preferably within an opening in the carrier pane.

The module can comprise a plurality of image producing devices, mounted to the same or different panes. As for example shown in FIG. 3, the module can include two image producing devices mounted, each to another pane, so as to allow image displaying through both panes.

The cavity 11 can comprise air or gas forced therein for any purpose such as improving the isolation of the window or the heat removal from the device. It is common to use Argon or other noble gas for the purpose of improved isolation.

The image producing device can be of a kind that includes an optical component responsive to illumination incident thereon. The optical response component can be of a light modulating kind such as LCD, light emissive kind such as electroluminescent display or OLED, reflective kind such as cholesteric liquid crystal, e-ink display or any other technology of image producing, and can have features such as, resolution, viewing angle, brightness, structural flexibility or others, as desired.

The device can use external illumination from a source outside the module or can include an illuminating component mounted within the module adjacent or spaced from the optical response component. For example, the illumination component can be mounted to either one of the panes or to a side wall of the cavity, if any, and can provide edge or back illumination to the optical response component. In particular, back illumination can be used when the optical component is a display component, which needs to be illuminated for images produced thereby to be seen. Such back illumination can be in the form of an OLED device. Back-lit response component can be preferred because it may not require an additional heat removal.

Figure 5:
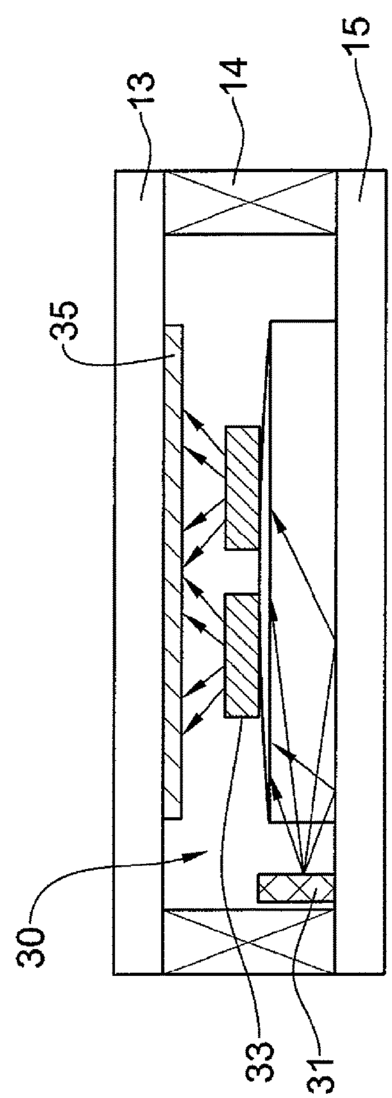
FIG. 5 is a schematic top view of window module according to a further example of the presently disclosed subject matter.

FIG. 5 illustrates one example of the optical response component 35 with an illuminating system generally designated as 30, including an illumination source 31, a waveguide 32 having an area corresponding to that of the component 35 and an illumination diffuser 33 configured to spread the illumination evenly on the surface of the response component 35.

Figure 6:
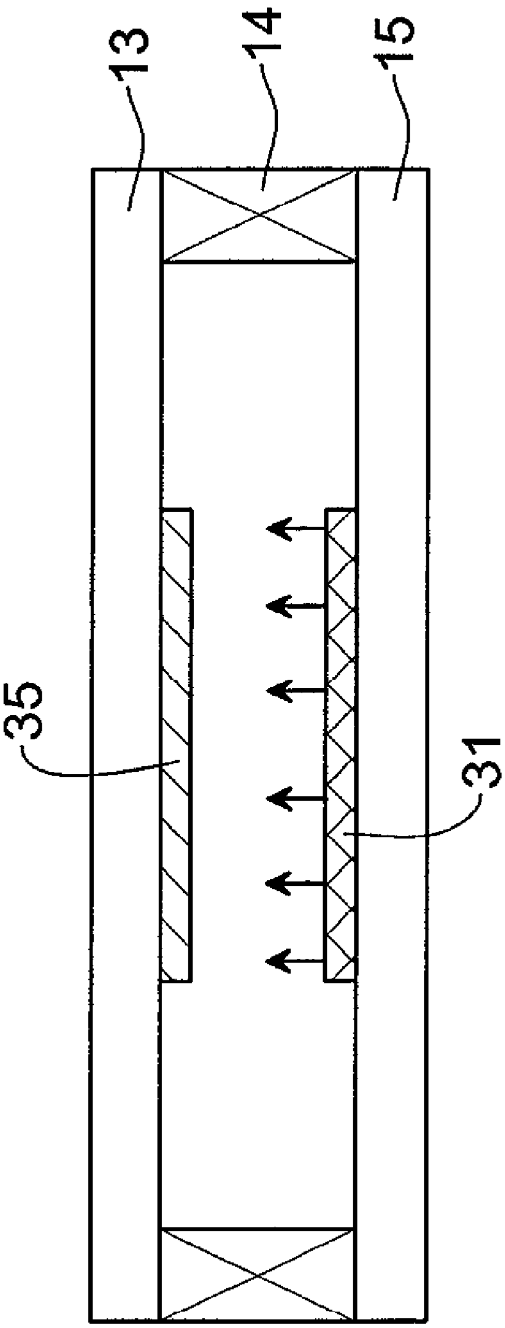
FIG. 6 is a schematic top view of a window module in accordance with still another example of the presently disclosed subject matter.

FIG. 6 illustrates a response component 35 with a back illuminating component 31 having an area corresponding to that of the component 35

The illumination component can be an electro-illumination component or a reflective illumination component, and it can be in the form of a cold cathode kind, led or fluorescent illumination or other.

Figure 11:
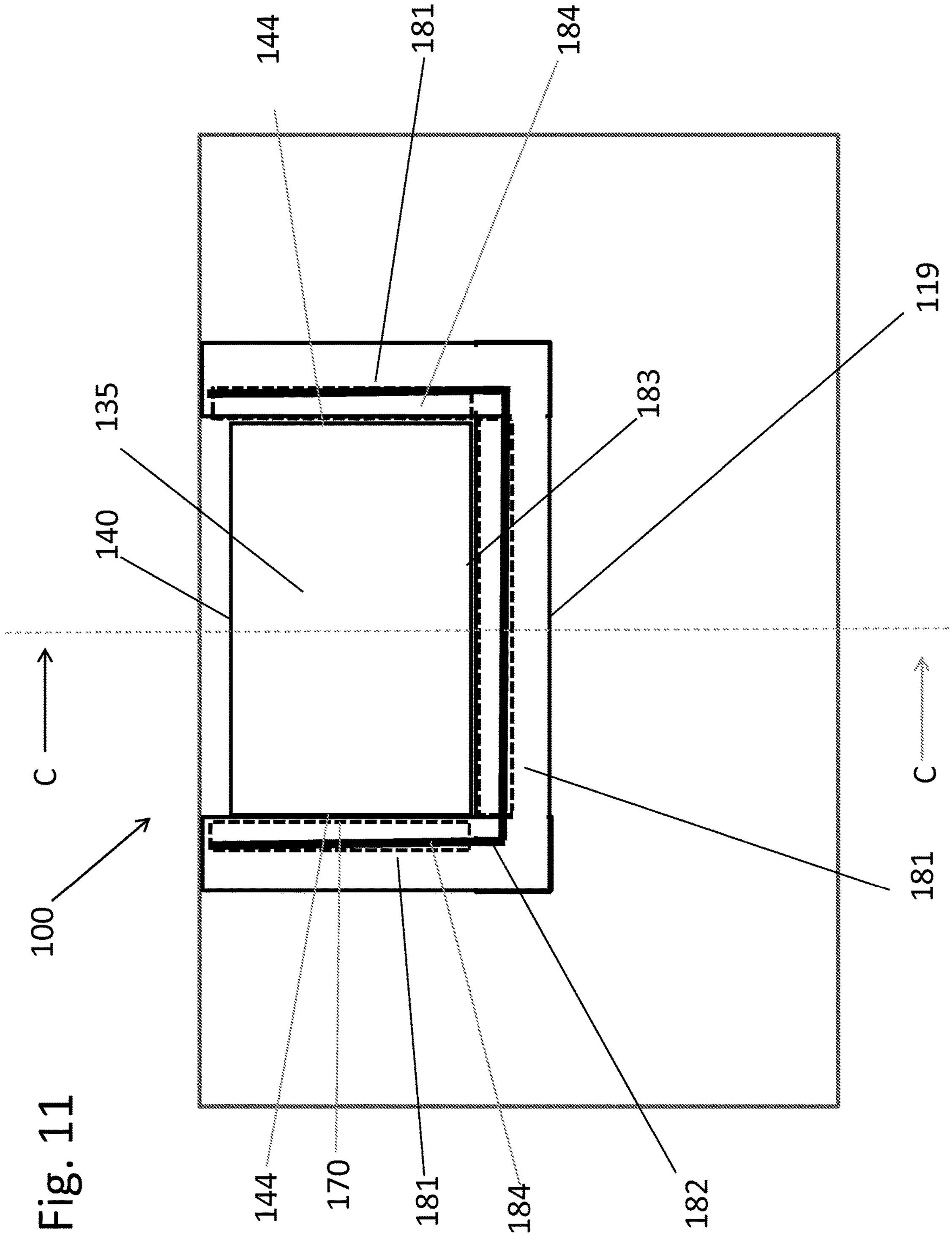
FIG. 11 is a schematic front view of a window module according to a still further example of the presently disclosed subject matter.
Figure 12:
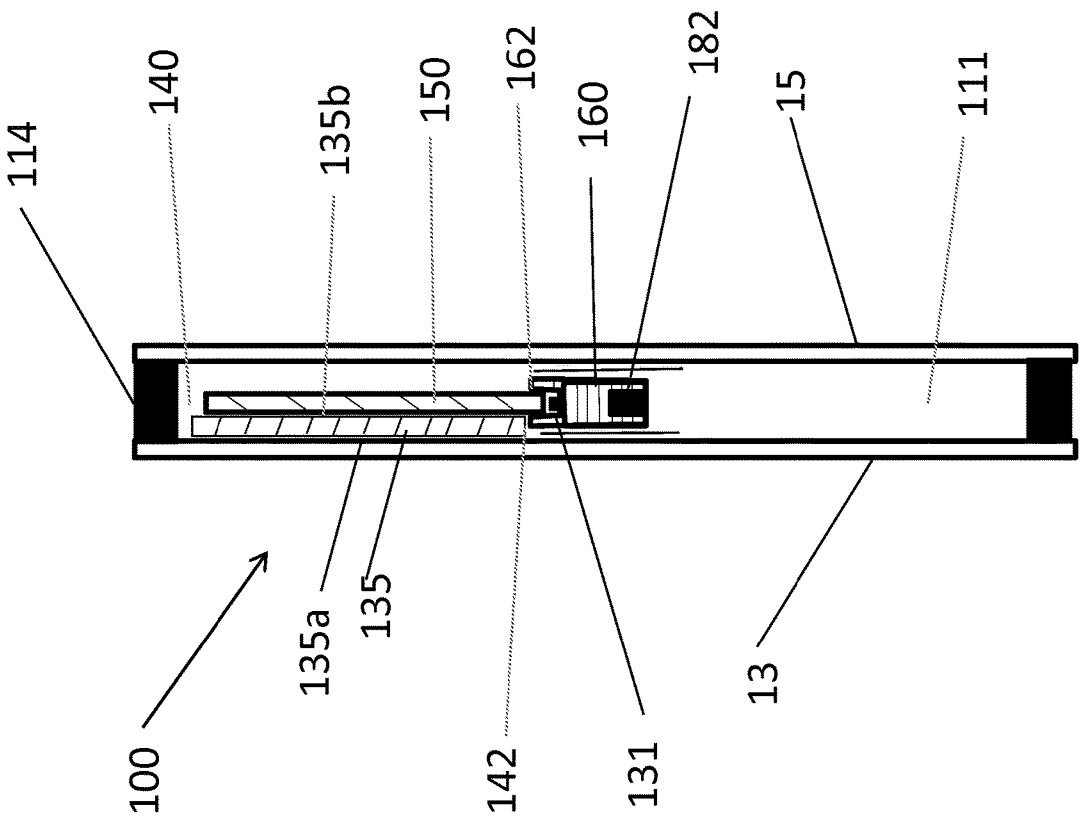
FIG. 12 is a cross-sectional view of the window module shown in FIG. 11, taken along a plane C-C.

FIGS. 11 and 12 illustrate a module 100, in which the image producing device comprises a display component 135 for producing images and an illumination system for illuminating the display component so as to allow viewing of the images from the direction facing the pane 13.

The display component 135 has two display component surfaces 135*a* 135*b* parallel to the panes 13 and 15, and top, bottom and side display component edges 140, 142 and 144, respectively (not seen), at which the surfaces terminate. The display component surface 135*a* is attached to or disposed adjacent the pane 13 and the display component surface 135*b* faces in the direction of the second pane 15.

The illumination system comprises an illumination source 131 disposed adjacent the bottom edge 142 of the display component and a light guide plate 150 disposed between the second display component surface 135*b* and the second pane 15 and aligned with the illumination source 131 so as to receive illumination therefrom and direct it to the second display component surface.

The module 100 further comprises a heat sink 160 mounted within the cavity 111 in thermal contact with the illumination source 131 for dissipating heat generated by the illumination source, the heat sink having a light guide plate supporting portion 162 for at least aligning the light guide plate with the illumination source. The illumination source 131 can be mounted in the heat sink 160 so as to form an integral illumination source unit.

As shown, the light guide plate supporting portion 162 of the heat sink 1 can be formed as a slot with the illumination source 131 mounted at its bottom, and with a bottom portion of the light guide plate 150 being received in the slot so as to be aligned with the illumination source. The slot 162 thus can serve to hold both the illumination source and the light guide plate in place in fixed mutual disposition.

Figure 13:
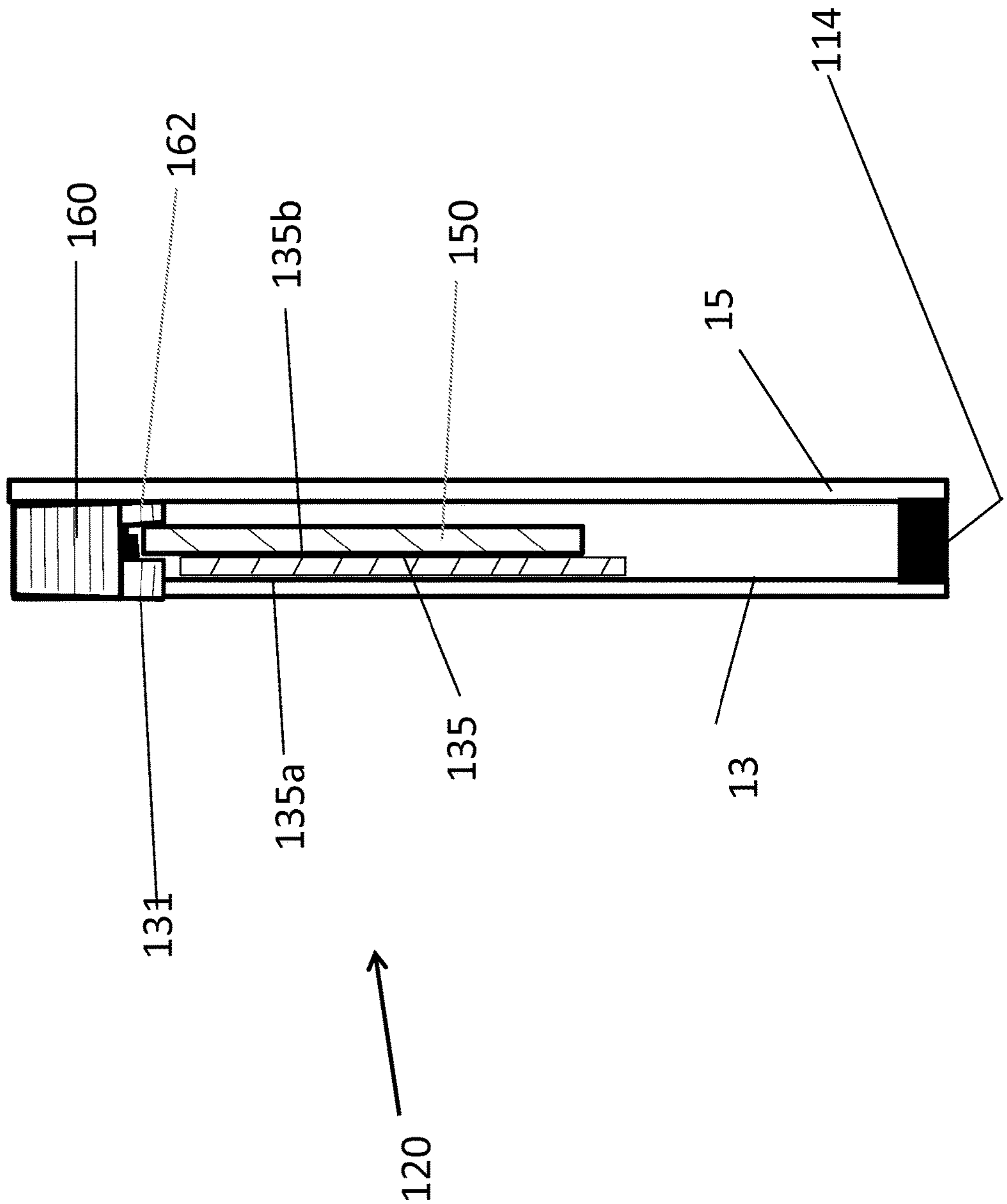
FIG. 13 is a cross-sectional view of a window module according to a further example of the presently disclosed subject matter, alternative to the example shown in FIGS. 11 and 12.

FIG. 12 illustrates the manner, in which the illumination source unit can be mounted relative to the sealing and spacing arrangement 114 of the module. As seen, the illumination source unit is disposed further from the sealing and spacing arrangement 114 than the display component 135. Alternatively, as shown in FIG. 13, the illumination source unit is disposed closer to the sealing and spacing arrangement 140 than the display component 135. In the former case, the heat sink 160 is mounted in thermal contact with the pane 13 for dissipating the heat therethrough, which dissipation can be facilitated when the pane 13 faces, for example, an air conditioned interior. In the latter case, the illumination source unit can be incorporated within the sealing and spacing arrangement of the structure and dissipate heat towards the exterior of this arrangement.

Since the heat sink 160 and the illumination source 131 described above are mounted so that, if not concealed, any of them will be viewed from a direction facing the outer surface of the pane 13, they can be concealed by a corresponding concealing component 119 (FIG. 11).

As best seen in FIG. 11, in addition to the heat sink 160 associated with the illumination source 131 as described above, the module 100 can comprise further heat sinks 170 and 180 disposed adjacent side edges 144 of the display component 135, for receiving heat from the heat sink 160 associated with the illumination source 131, via a heat pipe 182. In this case, the heat pipe 182 has a horizontal bottom section 183 in thermal contact the heat sink 160 and two vertical side sections 184, each being in contact with the corresponding side heat sink 170, 180, all the heat sinks being in thermal contact with the pane 13.

Figure 7:
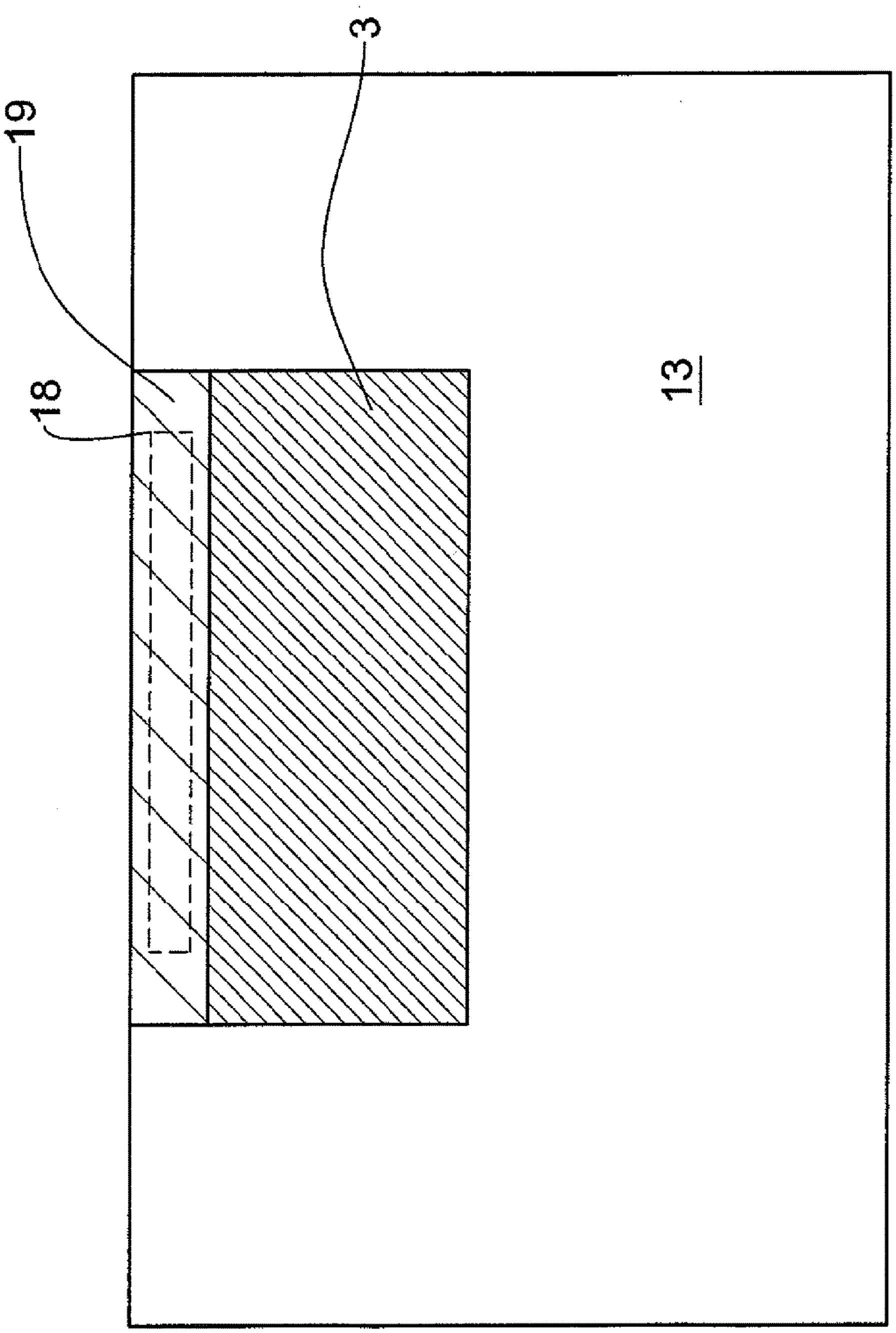
FIG. 7 is a schematic front view of a module according to a still further example of the presently disclosed subject matter.

FIG. 7 illustrates the module with the image producing device 3 having a proximal operational component 18 configured for participating in the operation of the image producing device. The proximal operational component can be any appropriate device and, for example, it can be one of more of the following: the above described heat sink with the associated illumination source, a driving board, timing controller board, a cable extending therefrom to the exterior of the module, or any other component necessary to the operation of the device, and which located inside the cavity.

As seen in FIG. 7, when the proximal operational component is disposed so that, if not concealed, it would be seen at least through one of the panes, the module can comprise a concealing component 19 preventing the operational component from being such seen. In this case, the concealing component can be disposed within the cavity between proximal operational component and the outer surface of the pane through which it would be seen if not concealed. In particular, it can be in the form of a layer of concealing material surrounding the image producing device when seen via its corresponding pane (FIG. 1) or in the form of a strip concealing only a selected area of the cavity. In FIG. 7, where the image producing device is shown as being disposed adjacent to one edge of the module and the proximal operational component is disposed between this edge and the edge of the device closest to the edge of the module, the concealing component covers the area between these edges.

The concealing can be disposed on the inner or outer surfaces of the pane through which images produced by the image producing device are to be seen, at a selected area thereof, whilst leaving free of this material other areas of the cavity. If only one pane of the module is occupying an image producing device, the back side of the device is being fully concealed as well.

The concealing material can possibly be a paint print, such as ceramic, epoxy or other. Alternatively, the concealing component can be in the form of a thin panel or channel capable of concealing proximal components and cables.

Figure 8:
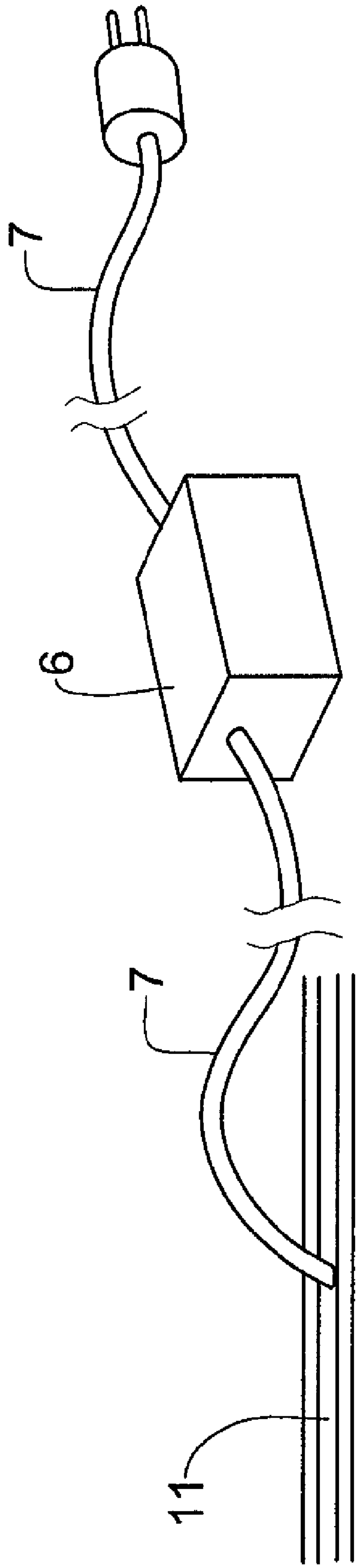
FIG. 8 is a schematic view of a cable extending from a module to a distal operational component, in accordance with a still further example of the presently disclosed subject matter.

The module further comprises at least one connecting cable 7, shown in FIG. 8, connected to the image producing device and/or its proximal operational component, and extending therefrom via the sealed frame 14 to an exterior of the module to be connected to at least one distal operational component disposed remote from the module and required for the operation of the device and/or the proximal operational component.

The at least one cable can transmit communication, control or other signal or electric power, or more than one of them in any combination, including all of the them, to the image producing device, and can be for example, LVDS (low voltage differential signaling) cable.

The at least one cable exit from the module can be at any point in the sealing frame 14, and this exist should be such as not to abolish the sealing of the cavity.

The distal operational component can be a control unit such as control unit 6 in FIG. 8, configured to allow displaying images by the image producing device 3 in a controlled manner. The control unit can include a controller to receive and to process data and to form commands to the drive unit of the module. The control unit can further include communication unit to receive data, for example WiFi or 3G communication unit, TV tuner, connectors like USB or HDMI connectors or slots for memory cards. It can include power supply unit, controlling board or any other component necessary to the operation of the module.

The module can allow an interactive user interface such as touch-screen or other control method. It can further comprise speakers or audio output socket or device disposed either within the cavity or adjacent to said module so as to allow sound applications in relation with images being displayed.

The control unit can be a single unit for controlling several image producing devices, or a single unit for controlling a single device. If plurality of units is held in one structure, they can be disposed either in a single location or in more than one location, according to the location of the respective image producing devices.

The structure in which the model described above can be used, can have an interior space and the module can be used to separate this space from the exterior of the structure, or to separate different regions of the interior space from each other, so as to allow viewing images produced by the image producing device of the module from at least one viewing direction and to allow viewing through the cavity at areas thereof free of the image producing device, its proximal components or concealing components.

The disposition of operational components remote from the module in such structure can allow to reduce the space that will be occupied by the module, thereby allowing it to fit in a platform of a structure which originally was not designed to be used with the module but rather was designed for use with another, standard or original transparent member not having an image producing device mounted therein. Alternatively, structures using such modules as described above can have a completely new design.

When used for mounting in existing platform of a structure, the module can be configured to have the same dimensions and shape as those of the original/standard member with which structure was originally designed, so as to allow its mounting in an opening or other portion of the platform, originally designed to receive the standard member. This can be used in upgrading a model of structures, such as vehicles or vessels, by mounting in their existing platforms modules such as described above, instead of their original transparent members, whether single-pane or double-pane. In this case, the module can be configured to have the same mechanical characteristics, such as vibration resistance, structural strength and humidity, energy and/or noise isolation, and meet the same required standards as the original transparent member, from the point of view of its withstanding working conditions and its functioning as a window, in particular, 'source window' providing required light transmission. Examples of standards, whose requirements can be met by the module as described above are presented in FIG. 10.

The modules can not only be used for mounting in openings in a structure to constitute windows therein, but they themselves can constitute such walls or doors, or form internal partitions within the interior space of a structure.

When used as windows, the module can be mounted in different places of a structure. The module can be an externally facing window separating between the interior area and the exterior area of the structure so as to allow viewing one of the areas from the other area at least at a portion of the window. The module can also be an internal window separating between two interior areas so as to allow viewing therethrough one of the areas from the other area.

For example, when used in a vehicle, the module can form an external cabin window (front, side or rear), a window in a door (internal or external), a divider or a partition anywhere in the cabin or as a replacement of any unit can be made of glass as appropriate.

Non-limiting examples of vehicles in which models such as described above can be used include trams, buses, small busses, ships, airplanes, private cars and all other means of transportation that include a passenger cabin.

Figure 9:
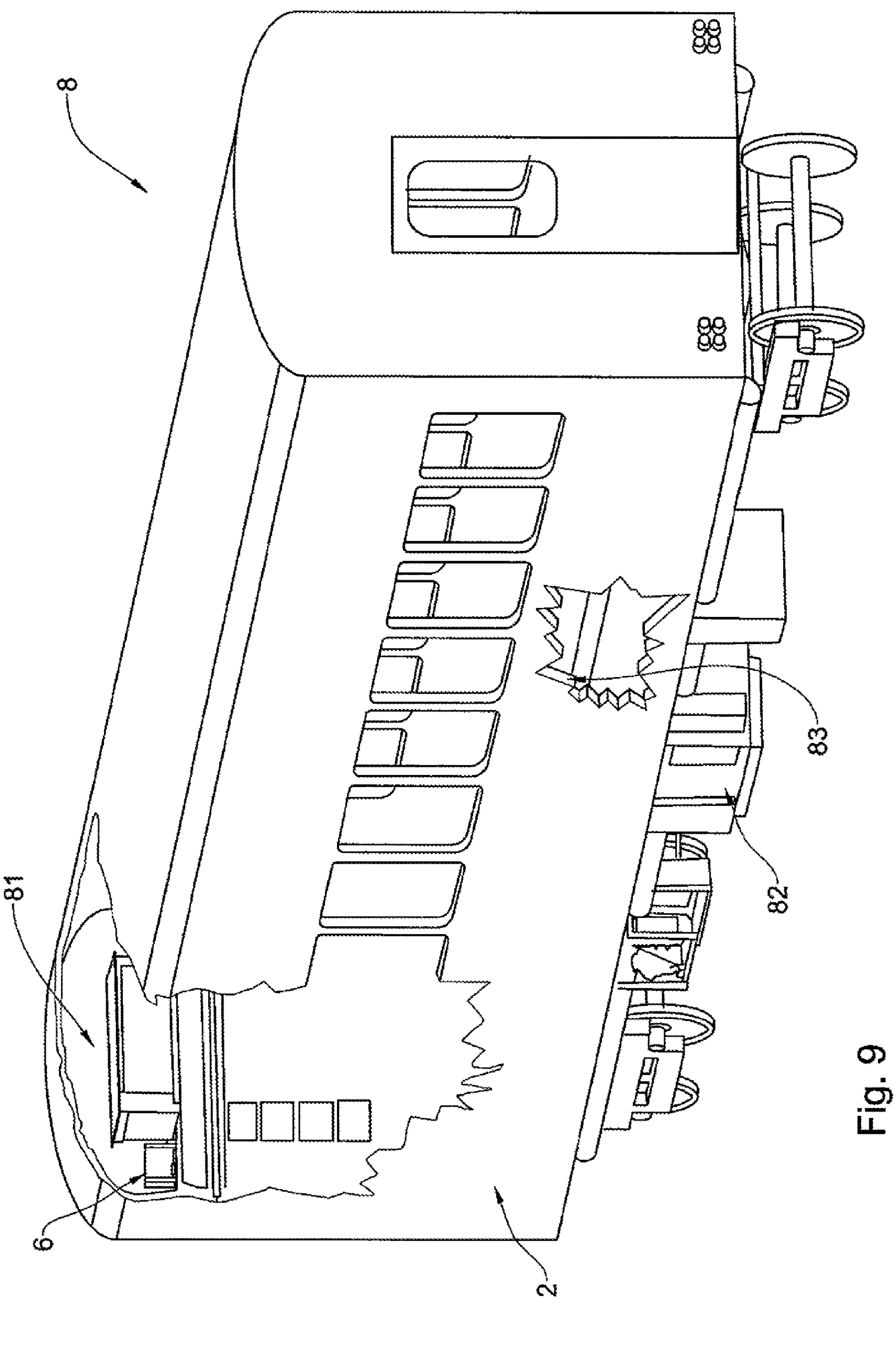
FIG. 9 shows one example of a platform of a wagon of a train, with openings for windows in which modules in accordance with the presently disclosed subject matter can be mounted.

FIG. 9 shows one example of an original platform 81 of a wagon of a train produced with openings designed to receive original transparent windows, and modules of the kind described above can be configured for mounting in such openings. As typical for vehicles and vessels, the openings are formed in a non-transparent wall 2 of the platform, which is provided, when the wagon is built thereon, with inner lining, thereby forming at least partially and most often, mostly, hollow space therebetween, which can be used as a passage (not shown) for receiving therein the cable 7, allowing extension of the cable from the module to a location spaced therefrom where there is disposed a distal operational device, as described above.

Structures, in which the module as described above can be used, typically have walls with hollow spaces for providing required isolation without unduly increasing the structure's weight. These hollow spaces can be used for accommodating cable/cables connecting the modules with their distal operational devices. In addition, in such structures, there can always be found a space for disposing the distal operational device therein. Examples of locations, in which the distal operational device can be disposed are one of the following: a hollow space between the structure's roof and ceiling, under the floor of the structure, in a hollow space within a wall of the structure, or in any other a designated place capable of containing the distal operational device.

In the example shown in FIG. 9, the distal operational device such as the control unit 6 with all the associated electronics can be disposed inside a space 81 of the platform under its roof, or at the bottom 82 of the platform or at an area 83 between the bottom 82 and the floor.

Electricity required for the modules in a structure such as a vehicle or a vessel, can be provided by the electric power source of the structure.

As mentioned above, the module, if constituting a part of a vehicle, should be configured to withstand working conditions of the vehicle to ensure the durability of the system. In this case, it can be configured to meet requirements of any relevant transportation standard such as standards concerning windows and glass units and electronic devices and displays. For example, when intended for use in train, the module should be configured to meet requirements of at least one of the standards listed in the Table presented in FIG. 10.

The module can comprise an operator interface and additional communication cables connecting each control unit with the operator interface, thereby allowing operation and control of any of the imaging displaying devices from the interface.

The module can be used to broadcast various contents—text, images and video, such as: route information, emergency notices, city and region info, news and online updates, movies, other content and commercial advertisements and internet surfing. The vehicle can be configured for public transportation, and the module can be used as passenger information system in a vehicle.

The content may be controlled by the operator and be programmed to play a certain sequence. The operator may also change the content online either from a control unit in the vehicle or from a distance via wired (to vehicle communication infrastructure), cellular or wireless control unit that connects all windows in the vehicle.

The controller may control all windows together or each window separately.

The window may also include various user interface add-ons such as touch-screen or wireless communication via certain application to transform the window to an interactive information system where the user can control the content.

The invention claimed is:

1. A module for mounting in a structure having an interior and configured for accommodating within said interior at least one person, the module comprising:

(a) two transparent panes, each one of the panes having an inner surface facing towards the other one of the two transparent panes and an outer surface facing away from the other one of the two transparent panes;

(b) a sealing and spacing arrangement sealingly fixing the two transparent panes to each other along respective peripheries thereof at a spaced apart relationship, thereby forming between the inner surfaces of the two transparent panes a transparent cavity having a sealing frame surrounding and sealing the cavity;

(c) an image producing device fixedly mounted within said cavity so as to allow viewing images produced thereby, from a viewing direction facing the outer surface of a first of said two transparent panes, while being spaced from the inner surface of a second of said two transparent panes;

(d) at least one concealing component configured for preventing at least one of the following:

said image producing device from being viewed from a direction other than said viewing direction, or at least one proximate operational component associated with said image producing device and located within said cavity from being viewed from a direction facing the outer surface of at least one of the two transparent panes, at least a portion of an area of the cavity being free of said image producing device, said operational component and said concealing component for viewing through at least said portion of the area of the cavity;

the module being configured for being mounted in said structure so as:

to constitute a transparent member separating between the space in said interior of the structure accommodating said at least one person and a region behind said member, and to allow viewing at least through said portion of the cavity.

2. The module according to claim 1, wherein said structure, in which the module is configured for mounting is a vehicle or vessel whose transparent members must meet pre-determined requirements dictated by the movement to be performed by said vehicle or vessel, and wherein the module meets such pre-determined requirements.

3. The module according to claim 1, wherein the module is configured to allow viewing in two opposite directions.

4. The module according to claim 1, wherein said operational component is concealed by two concealing components from being viewed in two directions, each facing the outer surface of one of the panels.

5. The module according to claim 1, wherein said concealing component occupies an area corresponding to that of the image producing device or of the operational component to be concealed, or the concealing component is constituted by a frame around the image producing device, when seen through the corresponding pane.

6. The module according to claim 1, further comprising at least one cable connected to at least one of said image producing device or to said proximate operational component, and extending therefrom via said sealed frame to an exterior of the module, the at least one cable being configured to provide at least one of the image producing device or the proximate operational component with a connection to at least one distal operational component disposed at a location remote from said module and required for the operation of the image producing device.

7. The module according to claim 6, wherein said distal component is constituted by one or more components, other than said at least one proximate operational component, required for the operation of the image producing device.

8. The module according to claim 7, configured to constitute a window in said structure when mounted within an opening in a non-transparent wall thereof, said wall including at least a passage located so as to allow the at least one cable to extend from the module to the passage, the passage being suitable for receiving said at least one cable and allowing extension of the cable to the distal operational component disposed at a location remote from said window.

9. The module according to claim 8, constituting a part of a structure in which said wall has an external surface, internal surface, and a space therebetween including said passage.

10. The module according to claim 9, wherein said location at which the distal operational component is disposed is within said space.

11. The module according to claim 9, further comprising a roof and a ceiling and said location at which the distal operational component is disposed, is therebetween.

12. The module according to claim 1, incorporated within a vehicle or a vessel including a plurality of compartments, each of the compartments comprising a plurality of openings in at least one wall of the compartment, wherein more than one opening has the module mounted herein.

13. A structure having an interior and configured for accommodating within said interior at least one person, the structure comprising:

a wall having an opening and at least a passage extending within said wall from said opening in a direction away therefrom;

a module including two transparent panes and a sealing and spacing arrangement sealingly fixing the panes to each other along respective peripheries thereof at a spaced apart relationship, thereby forming therebetween a transparent cavity with a sealing frame surrounding and sealing the cavity, and an image producing device fixedly mounted within said cavity so as to allow viewing images produced thereby, from the interior of the cavity, and so as to leave free for viewing through at least a portion of an area of the cavity;

at least one distal operational component required for operation of the image producing device and disposed remote from said opening; and at least one cable extending from said image producing device within said cavity via said sealed frame along said passage, and connecting the image producing device with said at least one distal component.

14. The structure according to claim 13, wherein said wall has a hollow space occupying a majority of an area of the wall and including said passage.

15. The structure according to claim 14, wherein said distal component is disposed adjacent to said hollow space and remote from said opening.

16. The structure according to claim 14, wherein the module is configured to be used instead of a standard window with which said structure used to be produced intended for allowing viewing therethrough in two opposite directions; said module has shape and dimensions of said standard window; and said portion of the cavity allowing said viewing in the opposite directions.

17. The structure according to claim 14, wherein said structure constitutes at least one compartment of a vehicle or vessel.

18. The structure according to claim 17, wherein said module is configured to meet requirements of at least one standard regulating characteristics of transparent or glass components in a vehicle or vessel, and relating to the following:

Railway application;
Railway rolling stock;
Safety glass;
Safety glazing materials;
Electrical insulation;
Military applications;
Safety-related systems; and
Displays and control actuators.

19. The structure according to claim 13, wherein said structure includes an electric power source electrically connected with said image producing device via said at least one cable.

20. A module for mounting in a structure having an interior and configured for accommodating within said interior at least one person, the module comprising:

two transparent panes, each one of the panes having an inner surface facing towards the other one of the two transparent panes and outer surface facing away from the other one of the two transparent panes;

a sealing and spacing arrangement sealingly fixing the two transparent panes to each other along respective peripheries thereof at a spaced apart relationship, thereby forming between the inner surfaces of the two transparent panes a transparent sealed cavity with a sealing frame surrounding the cavity;

an image producing device fixedly mounted within said cavity so as to allow viewing images produced thereby, from a viewing direction facing the outer surface of a first of said two transparent panes, while being spaced from the inner surface of a second of said two transparent panes, and so as to leave a portion of said cavity for viewing therethrough;

the module being configured for being mounted in said structure so as:

to constitute a transparent member separating between the space in said interior of the structure accommodating said at least one person and a region behind said transparent member, and to allow viewing at least through said portion of the cavity;

said structure being a vehicle or vessel whose transparent members must meet pre-determined requirements dictated by the movement to be performed by said vehicle or vessel, and the module meets such requirements.

* * * * *